United States Patent
Ishida et al.

(10) Patent No.: US 8,758,039 B2
(45) Date of Patent: Jun. 24, 2014

(54) LOCK STRUCTURE FOR BATTERY CHARGING CONNECTOR RECEPTACLE

(75) Inventors: Atsushi Ishida, Aichi (JP); Masanari Okuno, Aichi (JP); Shinji Ichikawa, Toyota (JP)

(73) Assignees: Kabushiki Kaisha Tokai Rika Denki Seisakusho, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 148 days.

(21) Appl. No.: 13/499,507

(22) PCT Filed: Sep. 29, 2010

(86) PCT No.: PCT/JP2010/067490
§ 371 (c)(1),
(2), (4) Date: Mar. 30, 2012

(87) PCT Pub. No.: WO2011/062004
PCT Pub. Date: May 26, 2011

(65) Prior Publication Data
US 2012/0186309 A1    Jul. 26, 2012

(30) Foreign Application Priority Data
Nov. 17, 2009    (JP) .................................. 2009-262289

(51) Int. Cl.
*H01R 13/62*    (2006.01)

(52) U.S. Cl.
USPC .......................................... 439/372; 439/352

(58) Field of Classification Search
USPC ..................... 439/34, 310, 352, 372; 320/109
See application file for complete search history.

(56) References Cited

U.S. PATENT DOCUMENTS

| | | | |
|---|---|---|---|
| 5,350,312 A | 9/1994 | Kuno et al. | |
| 5,429,524 A | 7/1995 | Wakata et al. | |
| 5,627,448 A | 5/1997 | Okada et al. | |
| 5,676,560 A | 10/1997 | Endo et al. | |
| 6,203,355 B1 | 3/2001 | Neblett et al. | |
| 6,276,948 B1 * | 8/2001 | Okabe | 439/157 |
| 6,755,673 B2 * | 6/2004 | Fukushima et al. | 439/157 |
| 7,419,390 B2 * | 9/2008 | Ohtaka et al. | 439/157 |
| 7,632,116 B2 * | 12/2009 | Lee et al. | 439/157 |
| 7,695,296 B1 * | 4/2010 | Hitchcock et al. | 439/157 |
| 8,147,261 B2 * | 4/2012 | Horiuchi | 439/157 |

FOREIGN PATENT DOCUMENTS

| | | |
|---|---|---|
| DE | 4343209 | 7/1994 |
| EP | 644625 | 3/1995 |
| EP | 646995 | 4/1995 |
| JP | 09-161898 | 6/1997 |
| WO | 2011/000776 | 1/2001 |

* cited by examiner

*Primary Examiner* — Thanh Tam Le
(74) *Attorney, Agent, or Firm* — Greenblum & Bernstein P.L.C.

(57) ABSTRACT

The locking device is for arrangement in the connector receptacle, which is connected to the charging connector that charges a battery, to interlock the connector receptacle and the charging connector. The locking device includes a notch engageable with a hook arranged in the charging connector. A lock bar is movable between a lock position, at which the lock bar restricts movement of the hook and keeps the hook and lock bar engaged, and an unlock position, at which the lock bar moves away from the hook and permits movement of the hook. A drive unit generates drive force for moving the lock bar from the unlock position to the lock position.

20 Claims, 8 Drawing Sheets

LOCK STRUCTURE FOR BATTERY CHARGING CONNECTOR RECEPTACLE

TECHNICAL FIELD

The present invention relates to a locking device arranged in a connector receptacle, which is connectable to a charging connector that supplies power for charging a battery, to interlock the charging connector with the connector receptacle.

BACKGROUND ART

Nowadays, automobile manufacturers are developing electric vehicles to reduce exhaust emissions from vehicles. In an electric vehicle, when the state of charge becomes low in a battery, which is the power source of the vehicle, a household outlet or charging stand must be used to charge the battery.

Japanese Laid-Open Patent Publication No. 9-161898 describes a system for charging an electric vehicle that can easily be used by a user. In the prior art charging system, the vehicle includes an inlet, or connector receptacle, to which a charging connector (charging coupler) is connected. The charging connector is plugged to, for example, a household commercial power grid. For example, when the user goes home, the user connects the charging connector to the inlet of the parked vehicle to charge the vehicle battery with commercial power.

Quick charging techniques for electric vehicle batteries have been developed. However, in comparison with when filling a gasoline vehicle with gasoline, battery charging requires a longer time. Further, households, in particular, are generally not equipped with quick charging equipment. When connecting a charging connector, which is plugged to a household outlet, to the inlet of the vehicle to charge the battery at home, the vehicle is often left unattended. In such a case, for example, someone may remove the charging connector from the vehicle that is being charged and connect the charging connector to the inlet of another vehicle to steal electricity. Further, the charging connector itself may be stolen.

Accordingly, there is a demand for a technique that prevents unauthorized removal of the charging connector from the inlet (connector receptacle) of the vehicle.

SUMMARY OF INVENTION

The present invention provides a locking device for a battery charging connector receptacle that prevents unauthorized removal of a charging connector from the connector receptacle.

One aspect of the present invention is a locking device for arrangement in a connector receptacle that is connectable to a charging connector, which charges a battery, to interlock the connector receptacle and the charging connector. The charging connector includes a hook arranged therein. The locking device includes an engagement portion engageable with the hook arranged in the charging connector. A restriction member is movable between a lock position, at which the restriction member restricts movement of the hook to keep the hook and engagement portion in an engaged state, and an unlock position, at which the restriction member moves away from the hook to permit movement of the hook. A drive unit generates drive force for moving the restriction member from the unlock position to the lock position.

DESCRIPTION OF EMBODIMENTS

A lock structure for a connector receptacle applied to, for example, a plug-in hybrid vehicle will now be discussed with reference to FIGS. 1 to 13.

Figure 1:
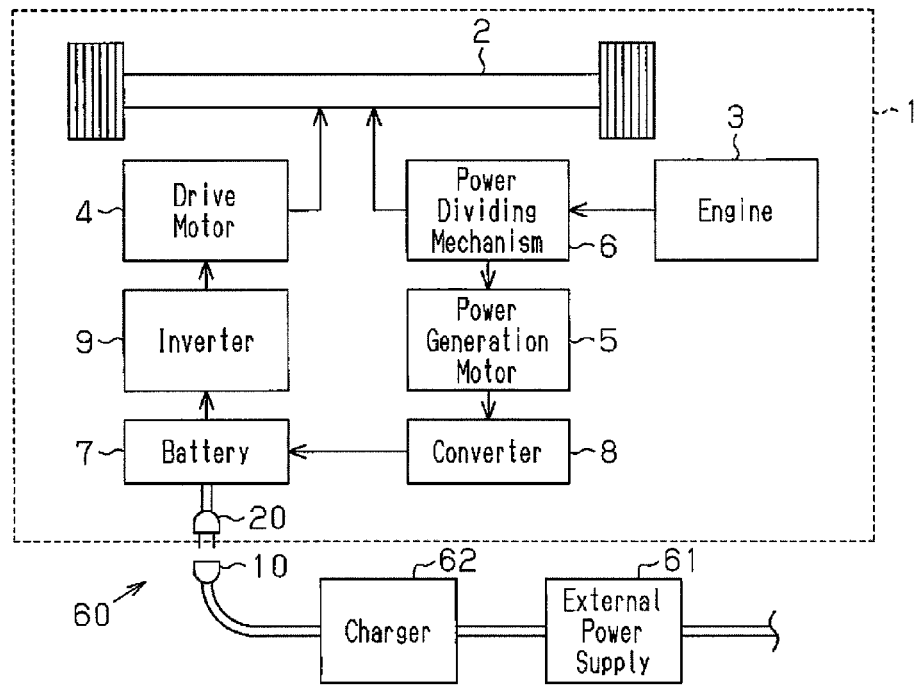
FIG. 1 is a schematic electrical diagram showing a vehicle including a charging system.

Referring to FIG. 1, a hybrid vehicle 1 includes drive wheels 2, which are driven by two drive sources, an engine 3 and a drive motor 4. The vehicle 1 is driven in a drive mode that is selected from the next four drive modes. In a first mode, only the power of the engine 3 is mechanically transmitted to the drive wheels 2. In a second mode, the motor 4 is powered by the engine 3 and drives the vehicle 1. In a third mode, the engine 3 and the drive motor 4 both directly drive the drive wheels 2. In the fourth mode, only the drive motor 4 drives the vehicle 1 without the engine 3.

A power dividing mechanism 6, which is arranged between the engine 3 and the drive wheels 2, divides the power generated by the engine 3 between the drive wheels 2 and a power generation motor 5. The power generation motor 5 is powered by the engine 3 to produce rotation and generate electric power. Further, the power generation motor 5 is connected to a battery 7 via a converter 8. Accordingly, the battery 7 is chargeable by the power generated by the power generation motor 5. The drive motor 4 is connected to the battery 7 via an inverter 9 and driven by the power accumulated in the battery 7.

The vehicle 1 includes a plug-in type charging system 60. The charging system 60 is capable of charging the battery 7 with power (nighttime power etc.) supplied from an external power supply 61, for example, a household outlet, in addition to the power generated by the power generation motor 5. This allows for the vehicle to travel for a longer distance with just the drive motor 4 than conventional hybrid vehicles. Further, the plug-in hybrid vehicle 1 does not need the engine 3 to be running when charging the battery 7. This reduces the operating time of the engine 3.

The charging system 60 includes a charger 62 for charging the battery 7 of the vehicle 1. The charger 62 is connected to a charging connector 10, which is connectable to a charging port of the vehicle 1. The charger 62 converts, for example, AC 200 V, which is supplied from the external power supply 61 (commercial power grid), into DC voltage and supplies the DC voltage to the vehicle 1 through the charging connector 10.

The vehicle 1 includes an inlet 20, or connector receptacle, which is connectable to the charging connector 10. The inlet 20 is a connector component into which the charging connector 10 is insertable. For example, the inlet 20 may be located at the rear sideward part of the vehicle body like a fuel lid of a gasoline vehicle. The inlet 20 delivers the DC voltage from the charging connector 10 to the battery 7 to charge the battery 7. The battery 7 becomes chargeable when a key carried by a user is authenticated and the charging connector 10 is connected to the inlet 20. The key authentication is performed, for example, by verifying an ID code of an electronic key.

Figure 2:
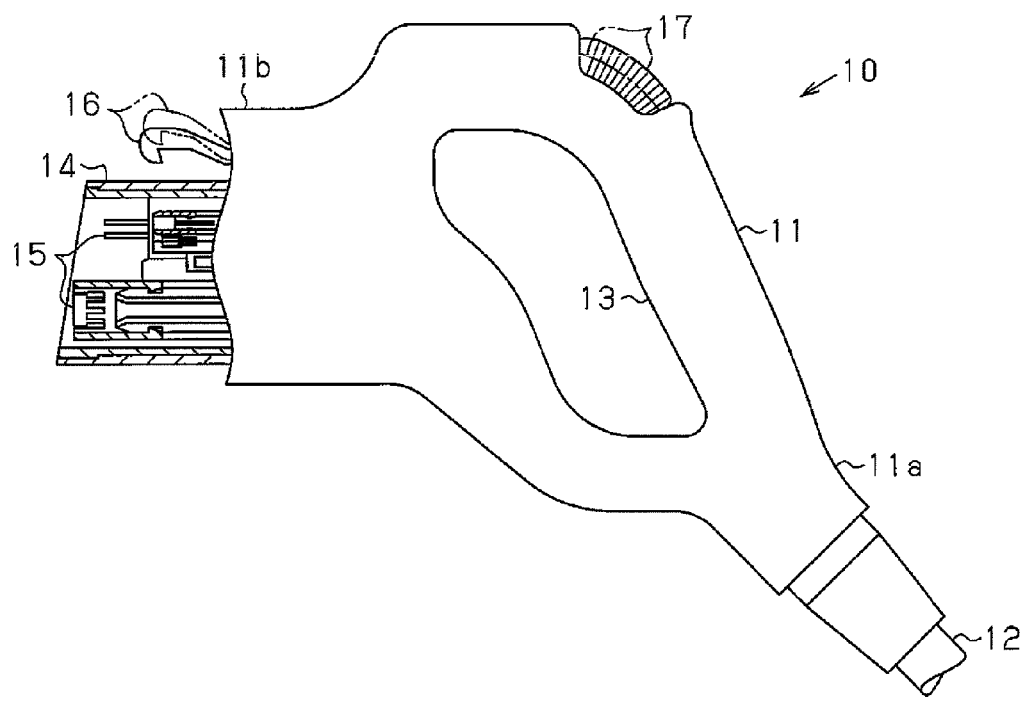
FIG. 2 is a schematic cross-sectional view showing a charging connector in the charging system of FIG. 1.

Referring to FIG. 2, the charging connector 10 includes a main body 11, which has a grip 13 that allows for grasping by a user. The main body 11 includes a basal end 11a and a distal end 11b. The basal end 11a of the main body 11 is connected to a cable 12, which extends from the charger 62. A fitting portion, or cylindrical sleeve 14, which is fittable to the inlet 20 of the vehicle 1, is arranged in the distal end 11b of the main body 11. A plurality of connection terminals 15, which electrically connect the charging connector 10 and the inlet 20, are arranged in the sleeve 14. The connection terminals 15 include a power terminal, which is used as a power transmission route, and a control terminal, which is used as a communication route for various types of control commands.

A hook 16 is arranged above the sleeve 14. The hook 16 is operated by a lever 17 arranged at the upper side of the grip 13 to keep the charging connector 10 in the inlet 20. The hook 16 when in a closed state as shown by the solid lines in FIG. 2 engages with the inlet 20 and interlocks the charging connector 10 with the inlet 20. When the hook 16 tilts and moves away from sleeve 14, that is, when the hook 16 is in an open state as shown by the broken lines in FIG. 2, the charging connector 10 is removable from the inlet 20. The hook 16 is normally held in a closed state. When the lever 17 is pushed, the hook 16 is lifted from the closed state to the open state.

Figure 3:
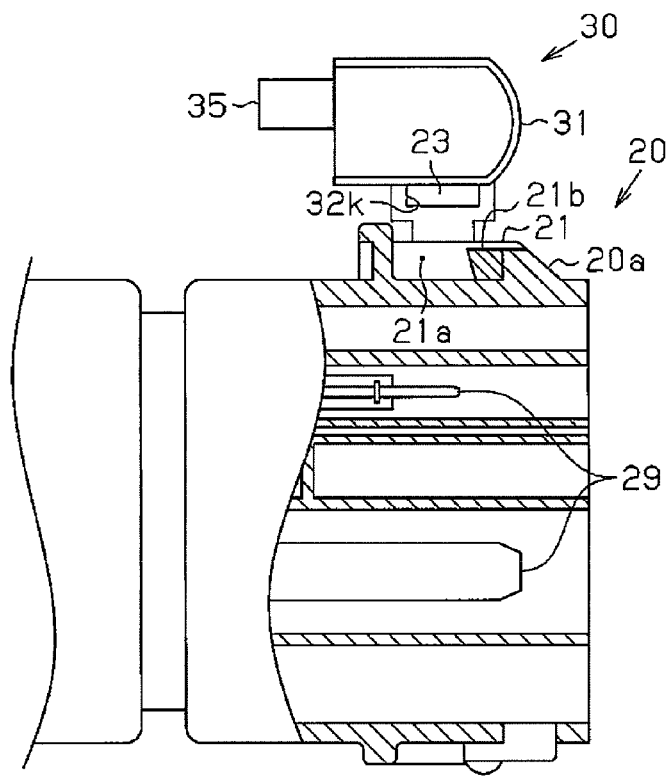
FIG. 3 is a schematic cross-sectional view showing an inlet (connector receptacle) in the charging system of FIG. 1.

Referring to FIG. 3, a plurality of connection terminals 29 are arranged in the inlet 20. The connection terminals 29 include a power terminal, which is used as a power transmission route, and a control terminal, which is used as a communication route for various types of control commands. Further, the connection terminals 29 are connectable to the connection terminals 15 of the charging connector 10. The inlet 20 has an outer surface 20a. Part of the outer surface 20a (upper part shown in FIG. 3) forms a notch 21, which serves as an engagement portion. The hook 16 of the charging connector 10 engages with the notch 21 to connect the charging connector 10 and the inlet 20. The notch 21 includes a cavity 21a into which the hook 16 is insertable. A projection 21b, which is engageable with the hook 16, is arranged in the cavity 21a.

Referring to FIGS. 4, 5, and 7 to 10, a locking device 30 is arranged in the upper part of the inlet 20. The locking device 30 switches the engagement state of the hook 16 to the notch 21 between a locked state and an unlocked state. The locked state is a state in which the notch 21 and hook 16 cannot be disengaged from each other. That is, in the locked state, the lever 17 cannot be operated (for example, pushed). As an example, the locking device 30 includes a motor 22, which serves as a drive unit, and a lock bar 23, which is driven by the motor 22 and serves as a restriction member. The lock bar 23 is movable between two positions, a lock position and an unlock position. The lock bar 23 restricts movement of the hook 16 at the lock position to hold the hook 16 and the notch 21 in the engaged state. That is, the hook 16 is locked and cannot be moved when the lock bar 23 is located at the lock position. The lock bar 23 permits movement of the hook 16 at the unlock position. That is, the hook 16 is unlocked when the lock bar 23 is located at the unlock position. In the preferred embodiment, the locking device 30 further includes a transmission member 25 (e.g., geared shaft), which is rotated by the motor 22, and a stopper 26, which serves to convert rotational motion of the transmission member 25 to linear motion. The linear motion of the stopper 26 arranges the lock bar 23 above the hook 16 and keeps the hook 16 in the locked state. In the locked state, the hook 16 cannot be moved to the open state.

Figure 5:
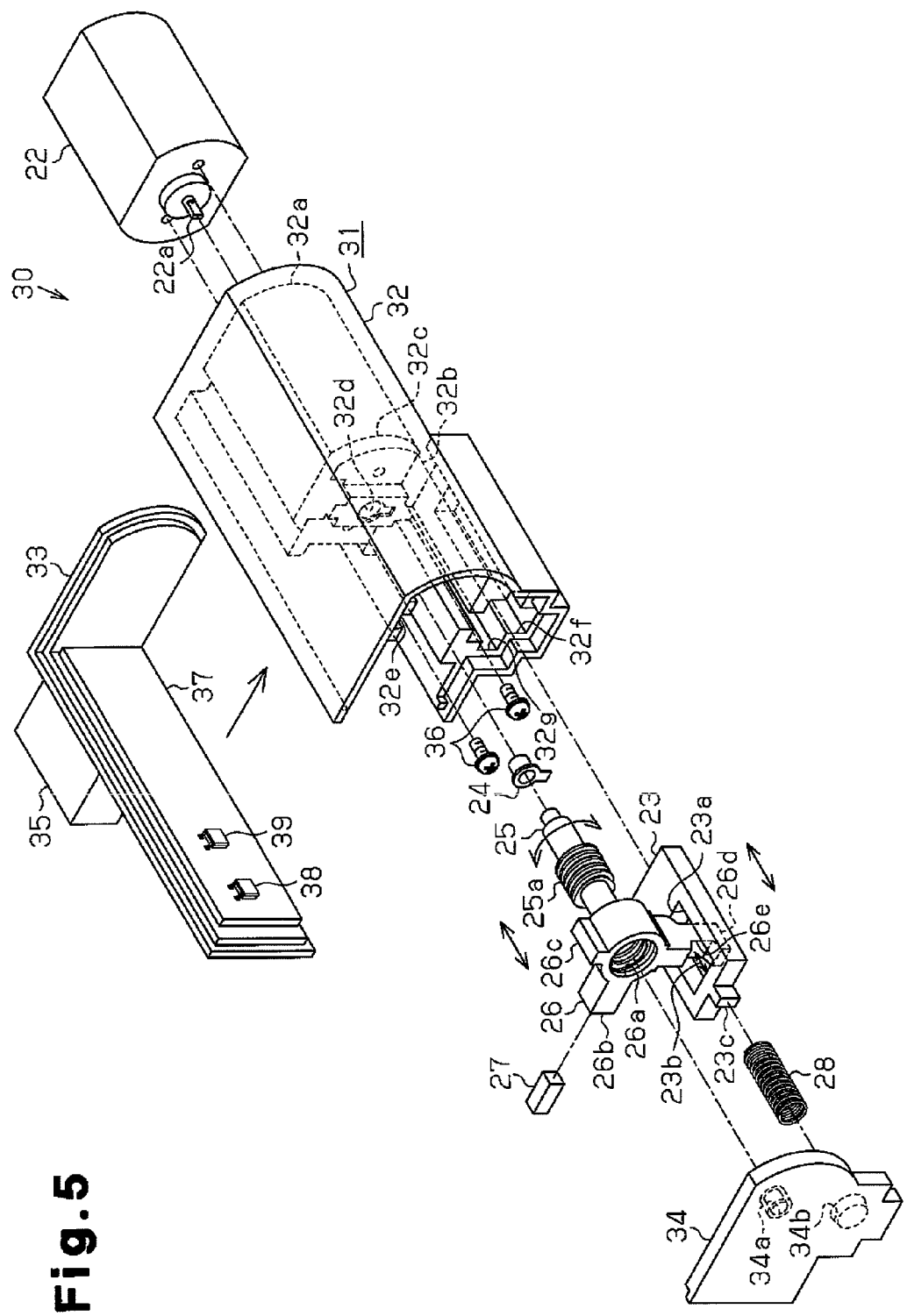
FIG. 5 is an exploded perspective view showing the locking device of FIG. 4.

The locking device 30 includes a main body case 31, which serves as an outer shell. The main body case 31 includes a main body 32, which accommodates the motor 22 and the lock bar 23, and first and second lids 33 and 34, which are coupled to the main body 32. Referring to FIG. 5, the main body 32, which has the shape of a rectangular box, has two open ends opposed to each other in the longitudinal direction and one open side. The first lid 33 is L-shaped and closes one of the open ends and the open side of the main body 32. The second lid 34 closes the other one of the open ends of the main body 32. A coupler 35 or connector, which is electrically connected to an external device (not shown), is arranged on the main body 32.

A motor compartment 32a, which accommodates the motor 22, and a component compartment 32b, which accommodates other components such as the lock bar 23, are formed in the main body 32. The motor compartment 32a and the component compartment 32b are partitioned by a partitioning wall 32c arranged in the main body 32. The motor 22 is fixed to the motor compartment 32a by two screws 36 (refer to FIG. 5). The motor 22 includes a drive shaft 22a. The drive shaft 22a projects into the component compartment 32b through an insertion hole 32d, which is formed in the partitioning wall 32c, and is fixed to the transmission member 25. Thus, the transmission member 25 rotates integrally with the drive shaft 22a. The transmission member 25, which is cylindrical, has one end supported by the drive shaft 22a and held in the insertion hole 32d by a buffer member 24. The transmission member 25 has another end supported by a shaft bearing 34a formed in the second lid 34. The transmission member 25 has an outer surface including threads extending in the circumferential direction that form a threaded male portion 25a.

The transmission member 25 is mated with the stopper 26. The stopper 26 abuts against and moves the lock bar 23. An insertion hole extends through the stopper 26 in the axial direction of the transmission member 25. The wall surface defining the insertion hole includes a threaded female portion 26a, which is mated with the threaded male portion 25a of the transmission member 25. That is, the stopper 26 is integrally coupled to the transmission member 25. Accordingly, when the motor 22 drives and rotates the threaded male portion 25a of the transmission member 25 relative to the threaded female portion 26a of the stopper 26, the stopper 26 moves linearly in the axial direction of the transmission member 25. In this manner, the threaded male portion 25a of the transmission member 25 and the threaded female portion 26a of the stopper 26 form a motion conversion mechanism that converts rotational motion to linear motion. The stopper 26 reciprocates between two positions, a restriction position and a non-restriction portion. The restriction position refers to a position at which the lock bar 23 restricts movement of the hook 16 and corresponds to the lock position of the lock bar 23. The non-restriction position refers to a position at which the lock bar 23 does not restrict movement of the hook 16 and corresponds to the unlock position of the lock bar 23.

Referring to FIG. 5, a magnet holder 26b is formed in the left part of the stopper 26 to accommodate a magnet 27, which is used when detecting the position of the stopper 26. The magnet holder 26b projects from the stopper 26 in a horizontal direction orthogonal to the movement direction of the stopper 26. A substrate 37 is attached to the inner surface of the first lid 33. First and second hall elements 38 and 39 are arranged on the substrate 37. The first and second hall elements 38 and 39 are located at positions corresponding to the unlock and lock positions of the stopper 26 (i.e., lock bar 23).

An upper rail 26c and lower rail 26d respectively project from an upper part and lower part of the stopper 26 to guide the linear motion of the stopper 26. The upper rail 26c is fitted into an upper rail groove 32e formed in the upper inner surface of the main body 32. The lower rail 26d is fitted into a lower rail groove 32f formed in the lower inner surface of the main body 32.

Figure 4:
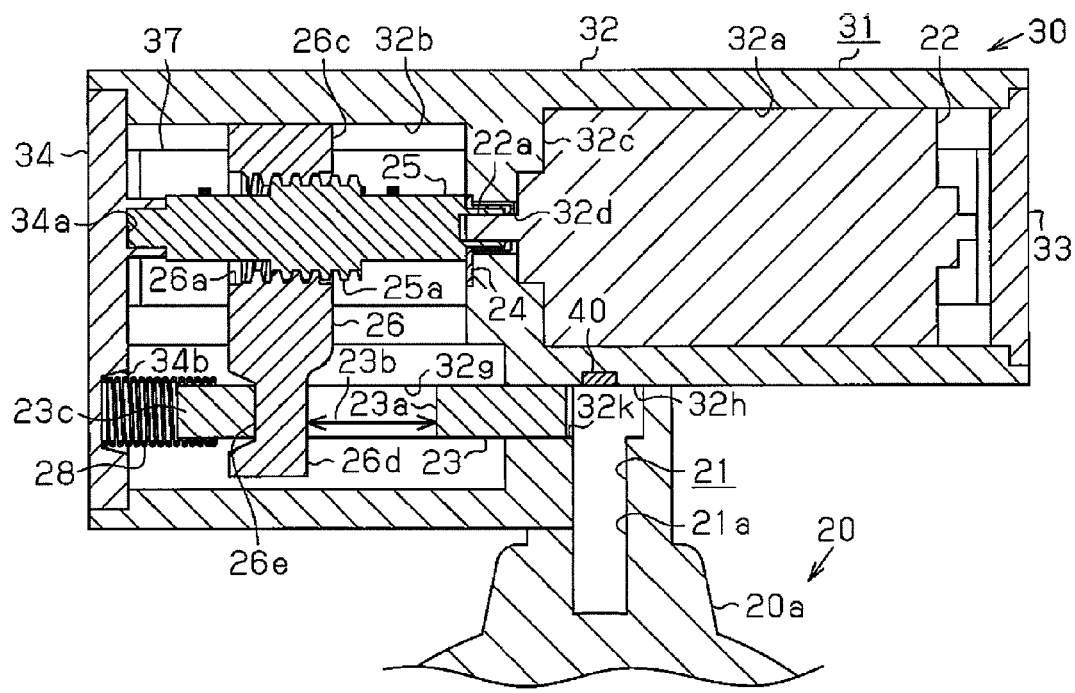
FIG. 4 is a schematic cross-sectional view showing a locking device arranged in the inlet of FIG. 3.

Referring to FIG. 4, the stopper 26 is inserted into the lock bar 23. The lock bar 23 is a planar component that restricts movement of the hook 16 as described above. In the preferred embodiment, a buffer hole 23a, or recess, is formed in the middle of the lock bar 23. The lower rail 26d of the stopper 26 has a base loosely fitted to the buffer hole 23a. Accordingly, a clearance 23b exists in the axial direction of the transmission member 25 between the wall of the buffer hole 23a and the lower rail 26d of the stopper 26 inserted into the buffer hole 23a. The lower rail 26d includes a depression 26e, which abuts against the wall of the buffer hole 23a and positions the lock bar 23. The lock bar 23 moves together with the stopper 26 in a state in which the wall of the buffer hole 23a is abut against the lower rail 26d. Accordingly, when the stopper 26 moves from the restriction position to the non-restriction position, the lock bar 23 moves from the lock position to the unlock position. The lock bar 23 is fitted to a guide groove 32g formed in the main body 32 and linearly moves along the guide groove 32g.

A projection hole 32k in which the lock bar 23 is movable is formed in the lower part of the main body 32. The lock bar 23 projects out of the component compartment 32b through the projection hole 32k to move to the lock position. Further, the main body 32 includes a support wall 32h, which supports the lock bar 23 from the upper side at the lock position. The support wall 32h is defined by a lower surface of the main body 32, for example, the lower surface of the motor compartment 32a. When the lock bar 23 is projected out of the projection hole 32k and located at the lock position, the support wall 32h restricts upward movement of the lock bar 23. To remove the charging connector 10 from the inlet 20, or connector receptacle, the hook 16 must be lifted to shift from the closed state to the open state. In this state, when the support wall 32h is located above the lock bar 23, upward movement of the lock bar 23 is restricted. Accordingly, the support wall 32h functions as a support for supporting the lock bar 23 and prevents unauthorized and forced removal of the charging connector 10 from the inlet 20 (connector receptacle).

A spring 28, which serves as an urging member that urges the lock bar 23 to the lock position, is arranged between the second lid 34 and the lock bar 23. The spring 28 has one end fixed to a pit 34b formed in the inner wall of the second lid 34. The spring 28 has another end fixed to a spring seat 23c projecting from the lock bar 23. The spring 28 urges the lock bar 23 away from the second lid 34 along the axial direction of the motor 22. That is, the urging force of the spring 28 urges the lock bar 23 to the lock position. When the stopper 26 moves in a direction opposite to the urging direction of the spring 28, the depression 26e of the stopper 26 pushes the wall of the buffer hole 23a in the lock bar 23. This moves the lock bar 23 to the unlock position. When the stopper 26 moves in the urging direction of the spring 28, the urging force of the spring 28 moves the lock bar 23 together with the stopper 26 toward the lock position.

Figure 10:
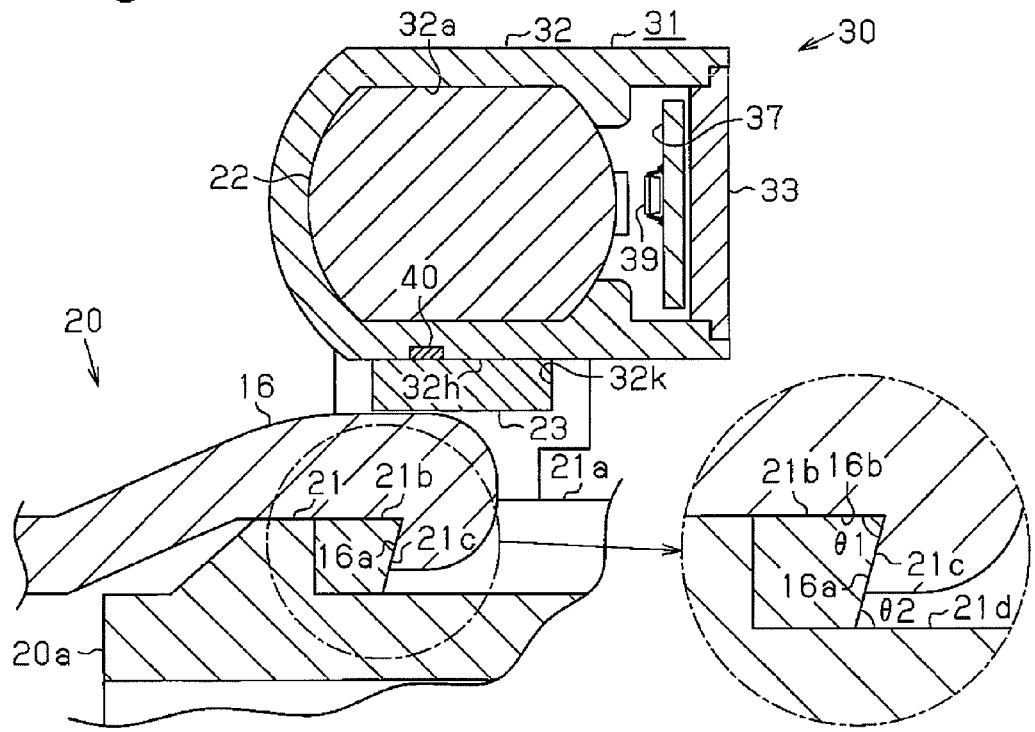
FIG. 10 is a cross-sectional view taken along line A-A in FIG. 9.
Figure 11:
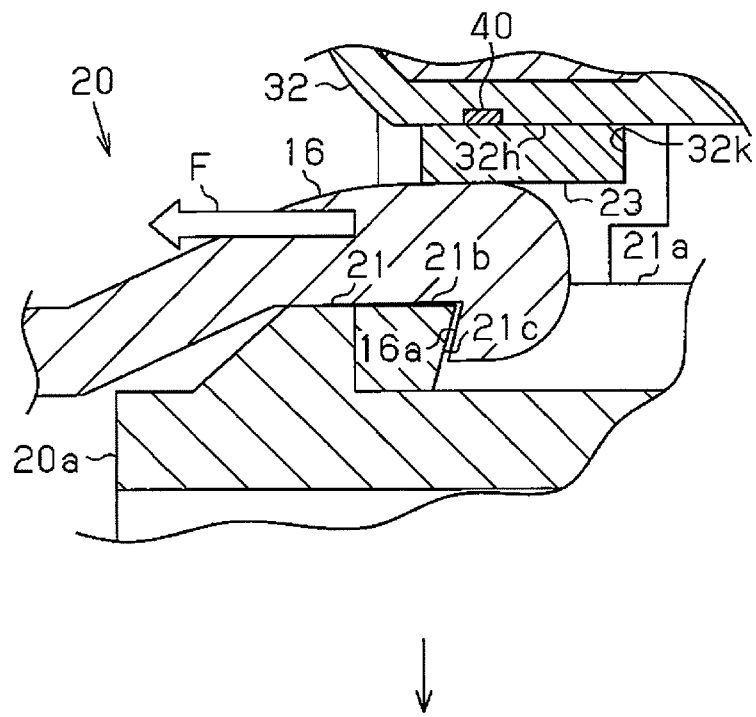
FIG. 11 is a cross-sectional view showing a situation in which a large removal load acts on a hook of the charging connector in the locked state of FIG. 9.
Figure 11:
Figure 11:
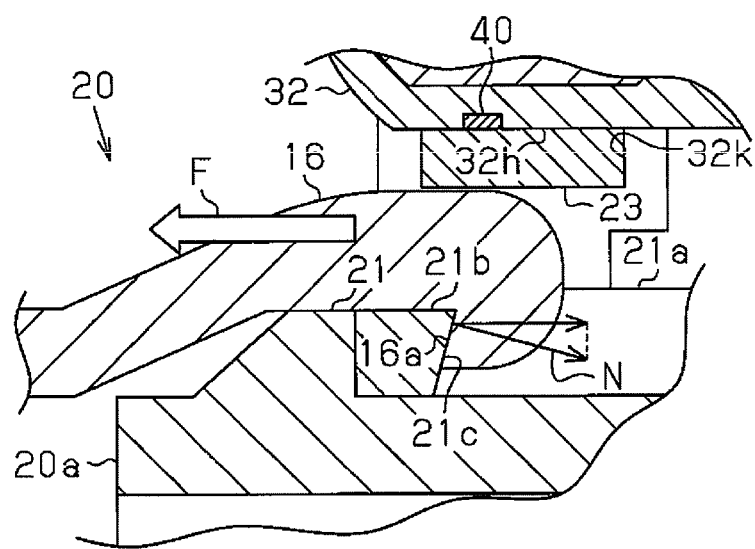

As shown by the enlarged view of FIG. 10, the hook 16 is formed to have an overhanging shape so as to extend into the notch 21. More specifically, the hook 16 has a distal end that is hooked backward (toward the left as viewed in FIG. 10). Further, the hook 16 has an engagement surface 16a, which is engageable with an engagement surface 21c formed on the projection 21b in the notch 21. The engagement surface 16a is formed at an acute angle relative to a neck surface 16b of the hook 16. In other words, an angle $\theta 1$ between the engagement surface 16a and the neck surface 16b is set to be less than 90°.

The engagement surface 21c of the projection 21b is formed to be diagonal relative to the vertical direction in conformance with the shape of the engagement surface 16a of the hook 16. That is, as a basal surface 21d, or bottom, of the notch 21 becomes farther, the engagement surface 21c projects further laterally as viewed in FIG. 10. In other words, an angle $\theta 2$ between the engagement surface 21c and the basal surface is set to be less than 90°. The angle $\theta 2$ conforms to the angle $\theta 1$.

Figure 6:
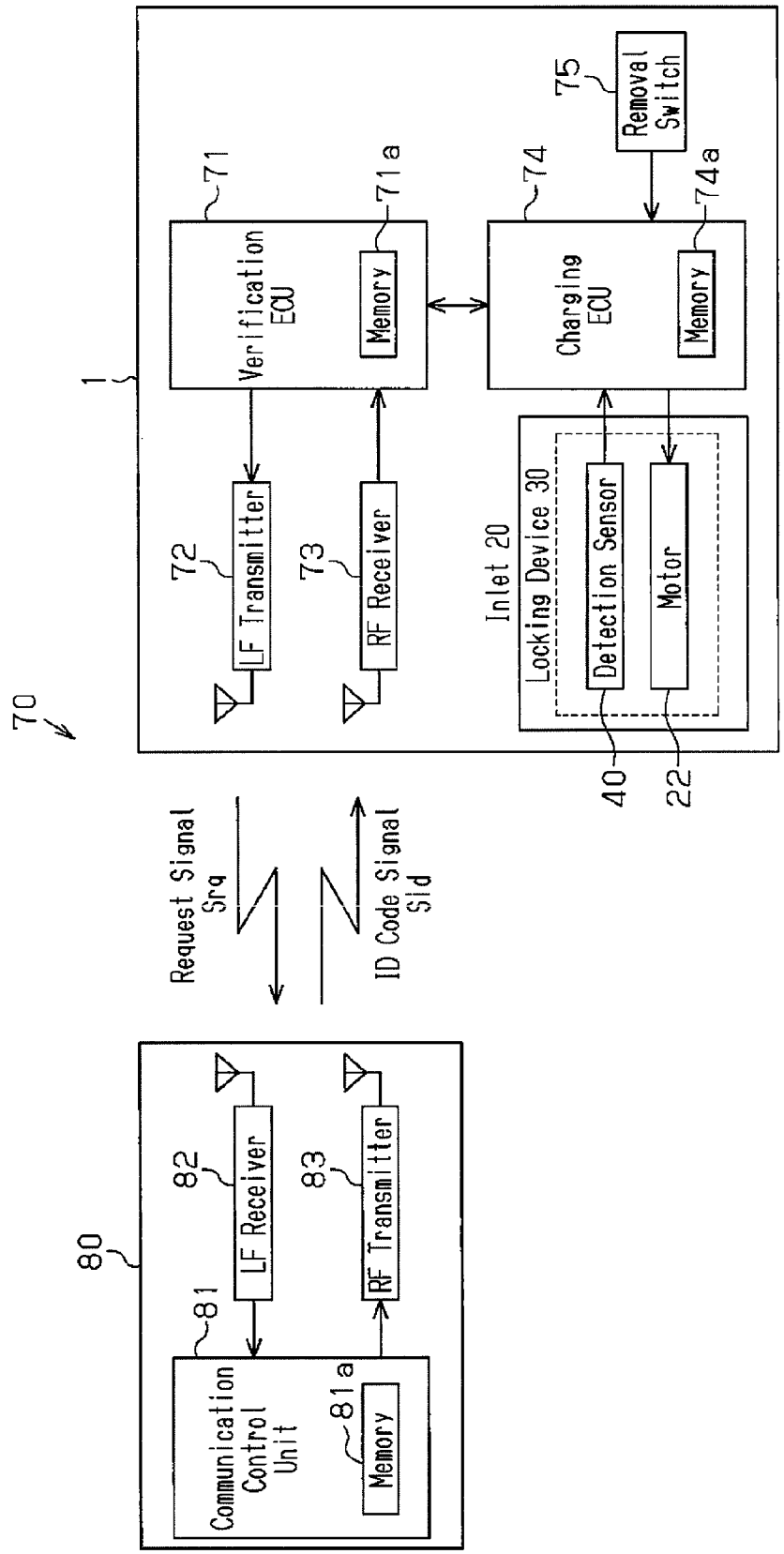
FIG. 6 is a schematic block diagram showing an electronic key system used with the charging system of FIG. 1.

Referring to FIG. 6, the vehicle 1 includes an electronic key system 70. The electronic key system 70 allows for the driver to, for example, lock and unlock the vehicle doors without actually using a vehicle key. The electronic key system 70 uses an electronic key 80 as a vehicle key that transmits a unique ID code through wireless communication. In response to an ID code request from the vehicle 1, the electronic key system 70 transmits a request signal Srq. In response to the request signal Srq, the electronic key 80 returns an ID code signal Sid, which includes an ID code of the electronic key 80, to the vehicle 1 through narrowband wireless communication. When the ID code of the electronic key 80 matches the ID code of the vehicle 1, the locking or unlocking of the doors is enabled or executed.

The electronic key system 70 will now be described in more detail. The vehicle 1 includes a verification electronic control unit (ECU) 71. The verification ECU 71 is connected to an LF transmitter 72 and an RF receiver 73. The LF transmitter 72 is arranged, for example, in each door of the vehicle 1 and transmits a low frequency (LF) band signal outside the vehicle 1. The RF receiver 73 is arranged, for example, in the rear part of the vehicle body and receives wireless signals in the radio frequency (RF) band. The verification ECU 71 includes a memory 71a, which stores a key code as a unique ID code.

The electronic key 80 includes a communication control unit 81, which serves as a control unit that controls wireless communication with the vehicle 1. The communication control unit 81 includes a memory 81a, which stores a key code as a unique ID code. The communication control unit 81 is connected to an LF receiver 82, which receives LF band signals, and an RF transmitter 83, which transmits RF and signals in accordance with instructions from the communication control unit 81.

The verification ECU 71 intermittently transmits the request signal Srq in the LF band from the LF transmitter 72 and forms a communication area near the vehicle 1. When in the communication area, the electronic key 80 receives the request signal Srq with the LF receiver 82. In response to the request signal Srq, the electronic key 80 returns the ID code signal Sid in the RF band including the ID code registered in the memory 81a from the RF transmitter 83. The verification ECU 71 receives the ID code signal Sid with the RF receiver 73 and verifies the ID code of the electronic key 80 with the ID code registered in the memory 71a to perform ID verification. When ID verification is established, the verification ECU 71 enables or performs locking or unlocking of the doors with a door locking device (not shown).

When ID verification is established and the charging connector 10 is connected to the inlet 20, the charging system 60 enables the charging operation to be performed. In the preferred embodiment, the vehicle 1 includes a charging ECU 74, which serves as a control unit for controlling charging. The charging ECU 74 communicates with the verification ECU through an in-vehicle local area network (LAN) and recognizes ID verification establishment. The charging ECU 74 is connected to the motor 22 and a detection sensor 40, which are arranged in the locking device 30 of the inlet 20. The detection sensor 40 serves as a detection unit and monitors whether or not the hook 16 is engaged with the notch 21. When the hook 16 is engaged with the notch 21, the detection sensor 40 provides a detection signal to the charging ECU 74. Then, when recognizing engagement of the hook 16 and the notch 21 under a situation in which ID verification is established, the locking device 30 is switched to a locked state to perform a charging operation.

To remove the charging connector 10 from the inlet 20 (connector receptacle), a removal switch 75, which is arranged on the vehicle 1, is operated. When ID verification is established in the electronic key system 70 and the removal switch 75 is operated, the charging system 60 permits removal of the charging connector 10 from the inlet 20 (connector receptacle). When the removal switch 75 operated, the charging ECU 74 receives an operation signal from the removal switch 75. When recognizing operation of the removal switch 75 under a situation in which ID verification is established, the charging ECU 74 switches the locking device 30 to an unlocked state and permits removal of the charging connector 10.

The assembling process of the locking device 30 will now be discussed with reference to FIGS. 4 and 5. The locking device 30 is assembled by joining all components, except for the first lid 33, in the longitudinal direction of the main body 32.

First, the motor 22 is inserted into the motor compartment 32a along the longitudinal direction of the main body 32. The drive shaft 22a is inserted through the insertion hole 32d in the partitioning wall 32c and projected into the component compartment 32b. Then, the motor 22 is fastened to the motor compartment 32a by the screws 36 (refer to FIG. 5).

The buffer member 24 is then arranged between the drive shaft 22a and the wall of the insertion hole 32d from the interior of the component compartment 32b. Then, the magnet 27 is inserted into the magnet holder 26b of the stopper 26. The threaded female portion 26a of the stopper 26 is mated with the threaded male portion 25a of the transmission member 25. The lower rail 26d of the stopper 26 is then inserted into the buffer hole 23a of the lock bar 23, and the depression 26e of the stopper 26 is abutted against the wall of the buffer hole 23a.

The integrally joined transmission member 25, stopper 26, and lock bar 23 are inserted into the component compartment 32b along the longitudinal direction of the main body 32. In this state, one end of the transmission member 25 is fixed to the drive shaft 22a, and the buffer member 24 is held between the end of the transmission member 25 and the partitioning wall (through hole 32d). Further, the lock bar 23 is fitted into the guide groove 32g of the main body 32. The upper rail 26c of the stopper 26 is fitted into the upper rail groove 32e of the main body 32, and the lower rail 26d of the stopper 26 is fitted into the lower rail groove 32f.

In a state in which the pit 34b of the second lid 34 is receiving one end of the spring 28, the second lid 34 is attached to the main body 32. In this state, the other end of the spring 28 is fitted onto the spring seat 23c of the lock bar 23.

The substrate 37 including the first and second hall elements 38 and 39 are then fixed to the first lid 33. The substrate 37 is electrically connected to the motor 22 and the coupler 35. Attachment of the first lid 33 to the main body 32 completes the assembly of the locking device 30.

The operation for charging the battery 7 with the charging connector 10 and the functions of the locking device 30 will now be discussed with reference to FIGS. 7 to 13.

The charging connector 10 is first connected to the inlet 20 (connector receptacle) of the vehicle 1. More specifically, the lever 17 of the charging connector 10 is pushed to move the hook 16 away from the sleeve 14 and shift the hook 16 to the open state, as shown by the broken lines in FIG. 2. From this state, the hook 16 is inserted into the notch 21 (cavity 21a), as shown by the broken lines in FIGS. 7 and 8. This connects the connection terminals 15 of the charging connector 10 with the connection terminals 29 of the inlet 20. In this state, the hook 16 is located above the projection 21b of the notch 21.

After connecting the connection terminals 15 and 29, the lever 17 is released to move and shift the hook 16 to the closed state. This engages the hook 16 with the projection 21b, as shown by the solid lines in FIGS. 7 and 8. The detection sensor 40 detects engagement of the hook 16 and the projection 21b and provides the charging ECU 74 with a detection signal. Based on the detection signal from the detection sensor 40, the charging ECU 74 sets a sensor detection flag (e.g., value "1") in the memory 74a. Further, when ID verification is established, the charging ECU 74 sets an ID verification flag (e.g., value "1") in the memory 74a. When the sensor detection flag and the ID verification flag are both "1", the ECU 74 outputs a drive signal that produces forward rotation with the motor 22 to start the locking operation of the hook 16.

When the motor 22 is driven, the drive force of the motor 22 rotates the transmission member 25. The rotational motion of the transmission member 25 is converted to linear motion of the stopper 26 by the threaded male portion 25a of the transmission member 25 and the threaded female portion 26a of the stopper 26. During the locking operation, the lock bar 23 is abutted against the depression 26e of the stopper 26 by the urging force of the spring 28 and moved to the lock position together with the stopper 26.

Figure 9:
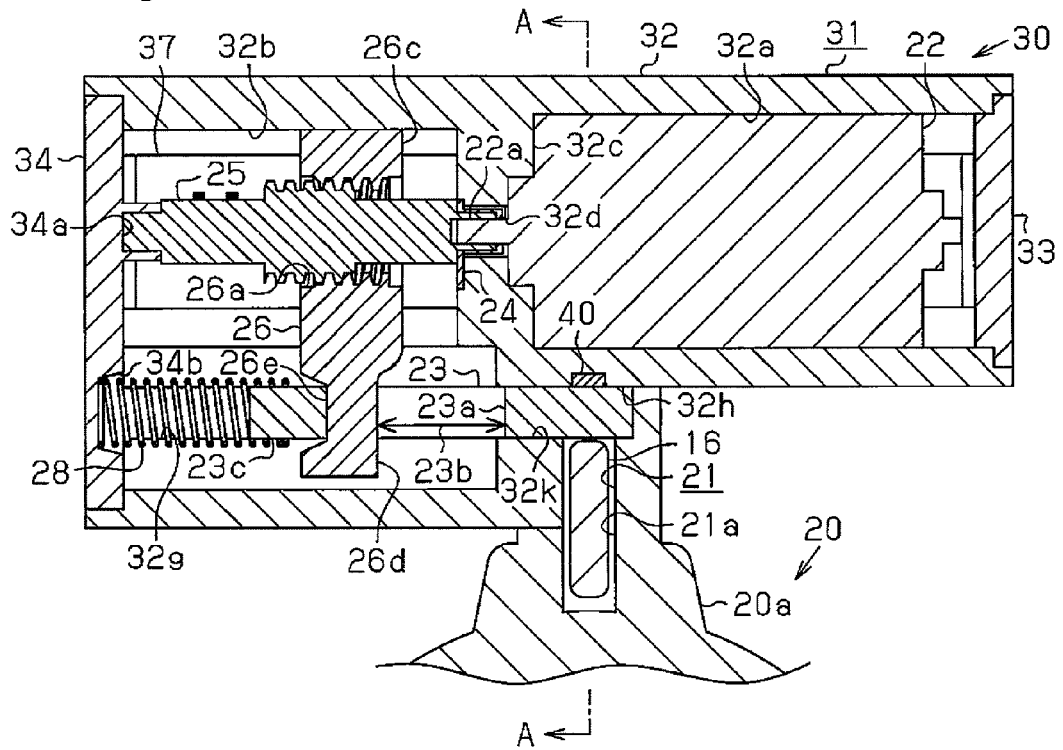
FIG. 9 is a cross-sectional view showing the lock of FIG. 4 in a locked state.

When the lock bar 23 is located at the lock position, the magnet 27 of the stopper 26 faces toward the second Hall element 39. Hence, the second hall element 39 detects the lock bar 23 at the lock position. When the second hall element 39 detects the lock bar 23 at the lock position, the motor 22 is deactivated to stop the lock bar 23 at the lock position. In this state, as shown in FIGS. 9 and 10, the lock bar 23 is located above the hook 16 and thus holds the hook 16 in the locked state. As described above, in the locked state, the hook 16 and the notch 21 cannot be disengaged from each other. When the hook 16 is in the locked state, the charging connector 10 feeds current to the inlet 20 and starts charging the battery 7.

When the hook 16 is in the locked state, for example, someone may attempt to forcibly remove the charging connector 10 from the inlet 20 by pulling out the charging connector 10. In such a case, referring to FIG. 11, a large removing force F acts on the hook 16 so as to upwardly displace the hook 16. However, the lock bar 23, which is located above the hook 16, restricts upward movement of the hook 16. Accordingly, the hook 16 and the notch 21 remain engaged with each other. This keeps the charging connector 10 connected to the inlet 20 and prevents unauthorized removal of the charging connector 10.

In case the hook 16 and the notch 21 were to be engaged with each other at a right angle, a large removing load F produced when forcible removal of the charging connector 10 is attempted may result in upward displacement of the hook 16 that lifts the lock bar 23. Such removing load F may also deform the hook 16. In such a case, the hook 16 may be disengaged from the notch 21, and the charging connector 10 may be removed from the inlet 20 in an unauthorized manner.

To prevent such undesirable disengagement, in the preferred embodiment, the distal end of the hook 16 has an overhanging shape. In this structure, as shown by the lower drawing in FIG. 11, part of the removal load F is released diagonally downward as a relief load N. This reduces the force that upwardly displaces the hook 16, or lifts the lock bar 23, even when a large removal load F is produced. As a result, excessive stress is prevented from being applied to the lock bar 23, and the lock bar 23 and the hook 16 are prevented from being damaged.

Further, when the lock bar 23 is located at the lock position, the lower surface of the main body 32 functions as the support wall 32h that supports the lock bar 23 from above. Thus, even if excessive stress is applied to the hook 16 when forcible removal of the charging connector 10 is attempted, the support wall 32h supports the lock bar 23 and ensures a high bending stress for the lock bar 23. This increases resistance to bending and damaging of the lock bar 23 thereby effectively preventing unauthorized cancellation of the locked state.

Figure 12:
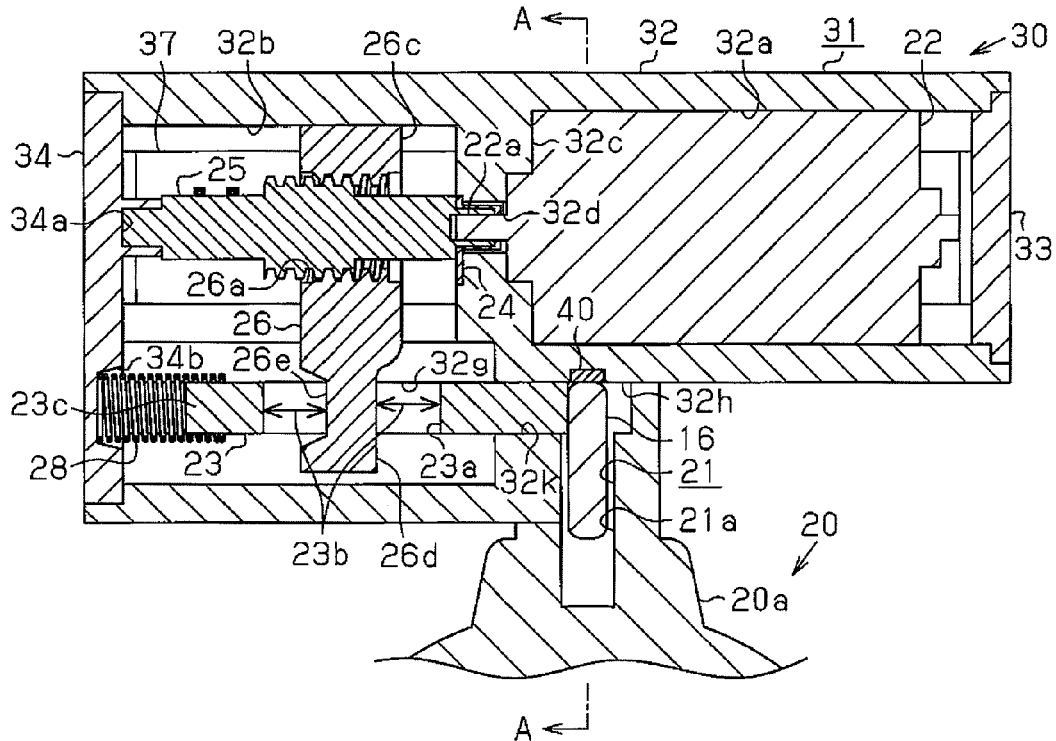
FIG. 12 is a cross-sectional view showing a situation in which the hook of charging connector is semi-fitted to an engaging portion in the lock of FIG. 4.
Figure 13:
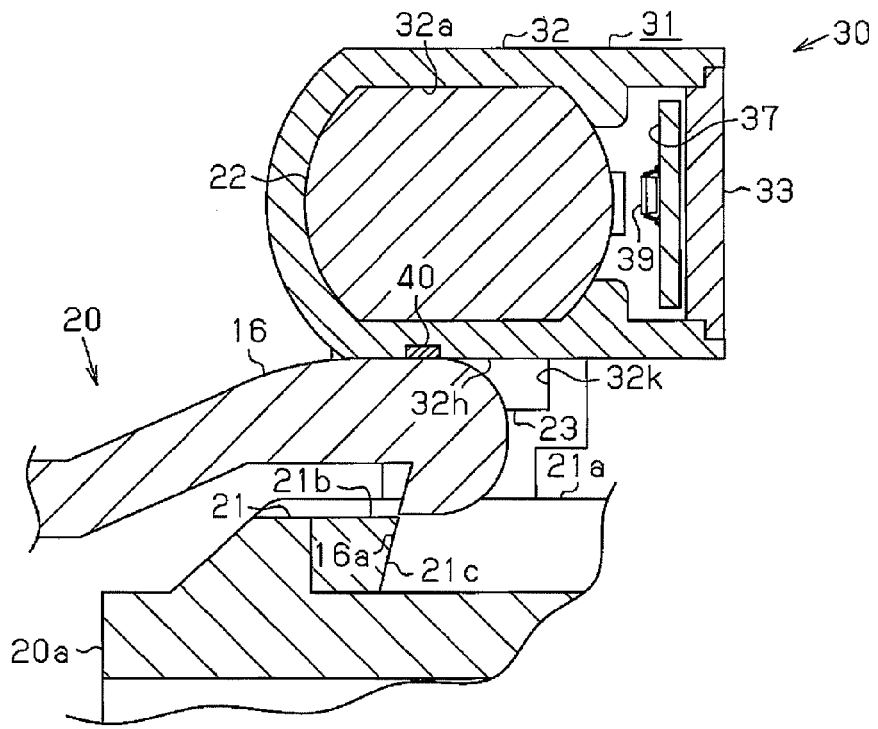
FIG. 13 is a cross-sectional view taken along line A-A in FIG. 12.

Referring to FIGS. 12 and 13, for example, when connecting the charging connector 10 to the inlet 20, the hook 16 may not completely engage with the notch 21 for one reason or another. For example, the hook 16 may be caught at the peak of the projection 21b and be semi-fitted, that is, not completely fitted, to the notch 21. In such a semi-fitted state, the hook 16 of the charging connector 10 interferes with movement of the lock bar 23 to the lock position.

In this state, as shown in FIG. 12, the hook 16 obstructs movement of the lock bar 23. However, the drive force of the motor 22 continues to move the stopper 26. In this case, the stopper 26 mechanically separates the motor 22 and the lock bar 23. Thus, even when the motor 22 continues to produce rotation, the drive force of the motor 22 is not transmitted to the lock bar 23. This prevents excessive drive force from being applied to the lock bar 23 that cannot be moved due to an obstacle. Thus, the lock bar 23 is held in a state stopped midway by the obstacle (hook 16). Further, the motor 22, the transmission member 25, the stopper 26, the lock bar 23, and the hook 16 do not receive excessive force and are prevented from being damaged.

The semi-fitted state of the hook 16 is resolved by slightly moving the charging connector 10 in vertical and horizontal directions to correctly position the charging connector 10 with respect to the inlet 20 (connector receptacle). When the hook 16 is meshed with, or fitted into, the notch 21 in a normal state, the urging force of the spring 28 automatically moves the lock bar 23 to the lock position. Thus, as long as the semi-fitted state is resolved, the lock bar 23 would be located at the lock position. This prevents the charging connector 10 from being left in an unlocked state.

When the charging of the battery 7 is completed, the user operates the removal switch 75 to remove the charging connector 10 from the inlet 20. The charging ECU 74 sets a switch operation flag (e.g., value "1") in the memory 74a based on the operation signal from a removal switch 75.

When the ID verification flag and the switch operation flag are both "1", the charging ECU 74 outputs a drive signal for producing reverse rotation with the motor 22 to start the unlocking operation of the hook 16.

When the motor 22 produces reverse rotation, the transmission member 25 rotates in a direction opposite to the rotation during the locking operation. This moves the stopper 26 in a direction opposite to the movement during the locking operation. During the locking operation, the lock bar 23 moves together with the stopper 26 to the unlock position against the urging force of the spring 28.

Figure 7:
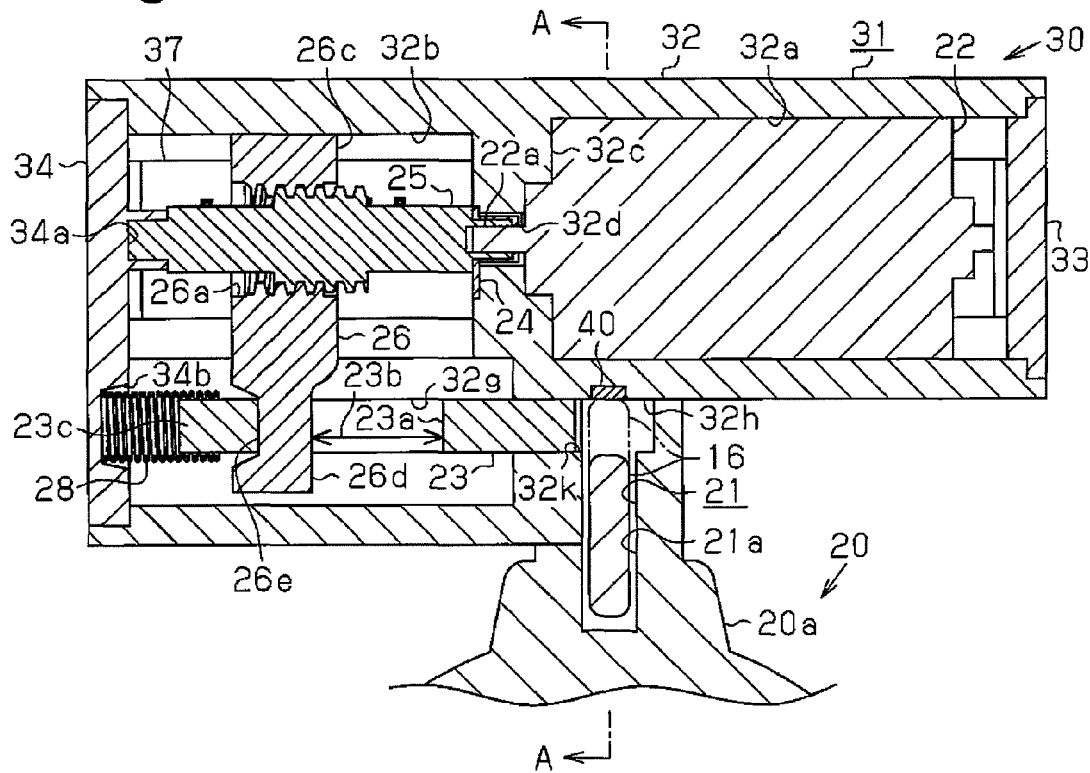
FIG. 7 is a cross-sectional view showing the locking device of FIG. 4 in an unlocked state.
Figure 8:
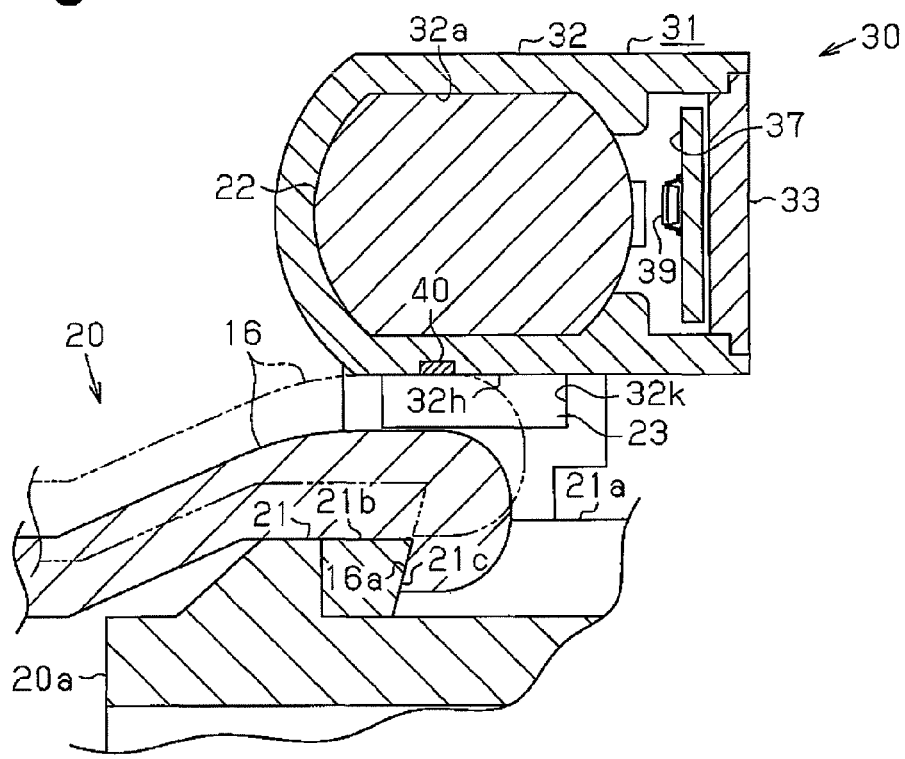
FIG. 8 is a cross-sectional view taken along line A-A in FIG. 7.

When the lock bar 23 is located at the unlock position, the magnet 27 of the stopper 26 faces toward the first hall element 38. Hence, the first hall element 38 detects the lock bar 23 at the unlock position. When the first hall element 38 detects the lock bar 23 at the unlock position, the motor 22 is deactivated to stop the lock bar 23 at the unlock position. In this state, as shown in FIGS. 7 and 8, the lock bar 23 is moved away from above the hook 16, and the hook 16 is held in the unlocked state. This allows for the hook 16 to be shifted to the open state by the lever 17. Thus, the hook 16 may be lifted to remove the charging connector 10 from the inlet 20.

The locking device 30 of the preferred embodiment has the advantages described below.

(1) When the charging connector 10 is connected to the inlet 20 (connector receptacle), the motor 22 moves the lock bar 23 to the lock position and holds the hook 16 and the notch 21 in a state engaged with each other. This keeps the hook 16 in the locked state. In this structure, the lock bar 23 restricts movement of the hook 16 even if a person other than the user, such as a third party, attempts to remove the charging connector 10 from the inlet 20 without permission. This prevents removal of the charging connector 10. Accordingly, theft of the charging connector 10 is prevented. This, in turn, prevents electricity from being stolen, which would happen when the charging connector 10 is connected to another vehicle.

(2) When the locking operation starts in a state in which the fitting of the hook 16 into the notch 21 is incomplete, that is, in a semi-fitted state of the hook 16, the lock bar 23 obstructs movement of the hook 16. In this case, the stopper 26 mechanically separates the motor 22 and the lock bar 23. Thus, even when the motor 22 continues to produce rotation, the stopper 26 does not transmit the drive force of the motor 22 to the lock bar 23. This prevents excessive drive force from being applied to the lock bar 23. Thus, the motor 22, the transmission member 25, the stopper 26, the lock bar 23, and the hook 16 are prevented from being damaged.

(3) As the hook 16 shifts from a semi-fitted state to a fully fitted state, the urging force of the spring 28 moves the lock bar 23 to the lock position. In this manner, as long as the semi-fitted state is resolved, the hook 16 of the charging connector 10 automatically shifts from an unlocked state to a locked state. This prevents the charging connector 10 from being left in an unlocked state and obtains a high level of security.

(4) The unlock operation is performed by driving the motor 22 in a direction opposite to the locking operation. This moves the lock bar 23 to the unlock position and holds the hook 16 in the unlocked state so that the charging connector 10 may be removed from the inlet 20.

(5) The motor 22 generates torque that is converted to linear motion of the lock bar 23 by the conversion mechanism (the threaded male portion 25a of the transmission member 25 and the threaded female portion 26a of the stopper 26). This structure obtains a relatively simple locking structure (locking device 30) with the motor 22.

(6) When the hook 16 is in a locked state, forcible removal of the charging connector 10 from the inlet 20 causes the hook 16 to apply excessive load on the lock bar 23. In this case, the support wall 23h supports the lock bar 23 at the side opposite to the hook 16. Thus, the support wall 32h absorbs excessive stress applied to the lock bar 23 and keeps the lock bar 23 in the locked state. This ensures that the capacity of the locking mechanism remains unaffected even when the lock bar 23 is manufactured from resin or the like to reduce costs. Accordingly, the locking capability is assured, while the component cost is reduced.

(7) The hook 16 is formed to have the overhanging shape with respect to the notch 21. In this structure, forcible removal of the charging connector 10 from the inlet 20 results in the overhanging shape releasing part of the load F applied to the hook 16 downward. This reduces the force acting to displace the hook 16 upward and prevents excessive load from being applied to the lock bar 23. Thus, damaging of the lock bar 23 is effectively prevented.

(8) The projection 21b (surface 21c) in the notch 21 is formed to be diagonal relative to the vertical direction in conformance with the shape of the hook 16 (surface 16a). That is, the hook 16 engages the projection 21b in the notch 21 at the acute angle $\theta 1$. In this structure, when forcibly removing the charging connector 10 from the inlet 20 in a locked state, a large part of the load F applied to the hook 16 may be released downward. This effectively prevents the lock bar 23 from being damaged.

(9) When the hook 16 is engaged with the projection 21b in the notch 21 and verification of the electronic key 80 is established, the lock bar 23 is moved to the lock position. Thus, for example, a third party cannot perform charging without permission. This increases the level of security.

(10) The lock bar 23 and motor 22 are coupled to and sequentially accommodated in the main body case 31. This allows for the locking device 30 to be easily assembled.

(11) The direction the lock bar 23 moves intersects with the direction the hook 16 engages with the notch 21. Thus, the removal load F produced at the hook 16 is released in a direction that differs from the movement direction of the lock bar 23. This further ensures prevention of damaging of the lock bar 23.

It should be apparent to those skilled in the art that the present invention may be embodied in many other specific forms without departing from the spirit or scope of the invention. Particularly, it should be understood that the present invention may be embodied in the following forms.

In the above-discussed embodiment, the drive unit is the motor 22. However, the drive unit may be a mechanical mechanism. For example, when the user operates an operation member such as a lever, a link may produce linear motion of the lock bar 23. Further, the drive unit may include first and second drive units, with the first drive unit moving the lock bar 23 from the unlock position to the lock position, and the second drive unit moving the lock bar 23 from the lock position to the unlock position.

In the above-discussed embodiment, the hook 16 is arranged above the sleeve 14 of the charging connector 10. Instead of arranging the hook 16 on one side of the sleeve 14, hooks may be arranged on opposite sides of the sleeve 14, such as the upper and lower sides.

In the above-discussed embodiment, the transmission member 25, the stopper 26, and the lock bar 23 are arranged in the longitudinal direction of the main body 32. However, the shapes, structures, and arrangement of the members may be changed as required.

In the above-discussed embodiment, the rotational motion produced by the motor 22 is converted to linear motion of the lock bar 23 in the axial direction of the motor 22. Instead, for example, the lock bar 23 may be rotated in the direction of the rotation produced by the motor 22.

In the above-discussed embodiment, the angle $\theta 1$ of the engaging surface 16a and the neck surface 16b and the angle $\theta 2$ of the engagement surface 16a and the basal surface 21d are both acute angles ($\theta 1 < 90°$, $\theta 2 < 90°$). However, just the angle $\theta 1$ may be an acute angle. This also keeps the hook 16 and the notch 21 (projection 21b) in a state engaged with each other. Alternatively, the angles $\theta 1$ and $\theta 2$ may both be right angles.

In the above-discussed embodiment, the support wall 32h may be eliminated.

In the above-discussed embodiment, the buffer hole 23a is formed in the lock bar 23. However, a recess may be formed in the lock bar 23 in lieu of the buffer hole 23a.

In the above-discussed embodiment, the buffer hole 23a may be eliminated from the lock bar 23. In this case, for example, the lock bar 23 is formed integrally with the stopper 26. That is, the lock bar 23 moves integrally with the stopper 26. In this structure, when the lock bar 23 cannot be moved due to an obstacle, it is preferable that an abnormality be detected by the first hall element 38 or the second hall element 39.

In the above-discussed embodiment, the motor 22 is used as the drive unit. However, a different component, such as a solenoid, may be used as the drive unit.

In the above-discussed embodiment, the locking device 30 is driven when the hook 16 is engaged with the projection 21b and ID verification is established. However, the locking device 30 may be driven under just the condition that the hook 16 is engaged with the projection 21b. In other words, various conditions may be used as the condition for connecting the connector 10 to the inlet 20.

In the above-discussed embodiment, operation of the removal switch 75 when ID verification is established releases the locking device 30 from the locked state. Instead, for example, full charging of the battery 7 may automatically release the locking device 30 from the locked state.

In the above-discussed embodiment, ID verification (key authentication) is performed with the electronic key 80. Instead, mechanical verification may be performed with a mechanical key.

In the above-discussed embodiment, the electronic key system 70 may be, for example, an immobilizer system that uses a transponder as a transmission origin of the ID code.

In the above-discussed embodiment, the frequency used by the electronic key system 70 is not limited to LF and RF and other frequencies may be used instead. Further, the frequency for transmitting radio waves from the vehicle 1 to the electronic key 80 does not necessarily have to differ from the frequency for returning radio waves from the electronic key 80 to the vehicle 1 and may be the same.

In the above-discussed embodiment, user authentication is not necessarily limited to key authentication using the electronic key 80 and may be another kind of authentication, such as biometric authentication.

In the above-discussed embodiment, the present invention is applied to the inlet 20 of the plug-in hybrid vehicle 1. However, the present invention is not limited to a plug-in hybrid vehicle 1 and may be applied to an inlet (connector receptacle) of an electric vehicle.

In the above-discussed embodiment, the locking device 30 does not have to be applied to the vehicle 1 and may be applied to any apparatus or equipment that includes a rechargeable battery.

The present examples and embodiments are to be considered as illustrative and not restrictive, and the invention is not to be limited to the details given herein, but may be modified within the scope and equivalence of the appended claims.

The invention claimed is:

1. A locking device for arrangement in a connector receptacle that is connectable to a charging connector, which charges a battery, to interlock the connector receptacle and the charging connector, wherein the charging connector includes a hook arranged therein, the locking device comprising:
   an engagement portion engageable with the hook arranged in the charging connector;
   a restriction member movable between a lock position, at which the restriction member restricts movement of the hook to keep the hook and the engagement portion in an engaged state, and an unlock position, at which the restriction member moves away from the hook to permit movement of the hook; and
   a drive unit that generates drive force for moving the restriction member from the unlock position to the lock position; and
   a stopper arranged between the restriction member and the drive unit and configured to hold the restriction member to move the restriction member based on the drive force of the drive unit, wherein the restriction member is held by the stopper so as to allow for movement of the restriction member relative to the stopper.

2. The locking device according to claim 1, further comprising:
   an urging member that urges the restriction member to the lock position; and
   a recess formed in the restriction member to hold the restriction member in the stopper and including a clearance from the stopper extending in a direction in which the restriction member moves.

3. The locking device according to claim 1, wherein the restriction member moves to the lock position when the drive unit is driven in a first direction, and the restriction member moves to the unlock position when the drive unit is driven in a second direction, which is opposite the first direction.

4. The locking device according to claim 1, wherein the drive unit generates torque as the drive force, the locking device further comprising:
   a conversion mechanism that converts the torque of the drive unit to linear motion of the restriction member between the lock position and the unlock position.

5. The locking device according to claim 1, further comprising:
   a support that supports the restriction member from the opposite side of the hook when the restriction member is located at the lock position.

6. The locking device according to claim 1, wherein the hook includes a distal end and is formed to have an overhanging shape so that the distal end of the hook is hooked backward relative to the engagement portion.

7. The locking device according to claim 6, wherein the engagement portion is formed to have a diagonal shape in conformance with the overhanging shape of the hook.

8. The locking device according to claim 1, further comprising:
   a control unit that controls movement of the restriction member with the drive unit;
   a detector that detects engagement of the hook with the engagement portion; and
   a verification unit that conducts wireless communication with an electronic key of an equipment including the connector receptacle to perform key verification;
   wherein the control unit drives the drive unit and moves the restriction member to the lock position when the hook is engaged with the engagement portion and the key verification is established.

9. The locking device according to claim 1, wherein the restriction member moves in a direction that intersects a direction in which the hook engages with the engagement portion.

10. The locking device according to claim 1, wherein the restriction member is moved to the lock position when starting the charging of the battery and is held at the lock position until the charging of the battery is completed.

11. The locking device according to claim 2, wherein the restriction member moves to the lock position when the drive unit is driven in a first direction, and the restriction member moves to the unlock position when the drive unit is driven in a second direction, which is opposite the first direction.

12. The locking device according to claim 2, wherein the drive unit generates torque as the drive force, the locking device further comprising:
   a conversion mechanism that converts the torque of the drive unit to linear motion of the restriction member between the lock position and the unlock position.

13. The locking device according to claim 2, further comprising:
   a support that supports the restriction member from the opposite side of the hook when the restriction member is located at the lock position.

14. The locking device according to claim 2, wherein the hook includes a distal end and is formed to have an overhanging shape so that the distal end of the hook is hooked backward relative to the engagement portion.

15. The locking device according to claim 14, wherein the engagement portion is formed to have a diagonal shape in conformance with the overhanging shape of the hook.

16. The locking device according to claim 2, further comprising:
   a control unit that controls movement of the restriction member with the drive unit;
   a detector that detects engagement of the hook with the engagement portion; and
   a verification unit that conducts wireless communication with an electronic key of an equipment including the connector receptacle to perform key verification;
   wherein the control unit drives the drive unit and moves the restriction member to the lock position when the hook is engaged with the engagement portion and the key verification is established.

17. The locking device according to claim 2, wherein the restriction member moves in a direction that intersects a direction in which the hook engages with the engagement portion.

18. The locking device according to claim 2, wherein the restriction member is moved to the lock position when starting the charging of the battery and is held at the lock position until the charging of the battery is completed.

19. The locking device according to claim 3, wherein the drive unit generates torque as the drive force, the locking device further comprising:
   a conversion mechanism that converts the torque of the drive unit to linear motion of the restriction member between the lock position and the unlock position.

20. The locking device according to claim 3, further comprising:
- a support that supports the restriction member from the opposite side of the hook when the restriction member is located at the lock position.

* * * * *